United States Patent
Eisele et al.

(10) Patent No.: US 8,690,724 B2
(45) Date of Patent: Apr. 8, 2014

(54) METHOD FOR OPERATING A DRIVE TRAIN

(75) Inventors: Markus Eisele, Friedrichshafen (DE); Yvonne Wiegand, Nuremberg (DE); Jurgen Blaser, Meckenbeuren (DE)

(73) Assignee: ZF Friedrichshafen AG, Friedrichshafen ( * ) Notice: Subject to any disclaimer, the term of this patent is extended or adjusted under 35 U.S.C. 154(b) by 0 days.

(21) Appl. No.: 13/697,176

(22) PCT Filed: Apr. 4, 2011

(86) PCT No.: PCT/EP2011/055164
§ 371 (c)(1),
(2), (4) Date: Nov. 9, 2012

(87) PCT Pub. No.: WO2011/147616
PCT Pub. Date: Dec. 1, 2011

(65) Prior Publication Data
US 2013/0065728 A1     Mar. 14, 2013

(30) Foreign Application Priority Data

May 27, 2010   (DE) .......................... 10 2010 029 386

(51) Int. Cl.
  *B60W 10/08*   (2006.01)
  *B60T 8/64*    (2006.01)
(52) U.S. Cl.
  USPC ............................................. 477/4; 303/152
(58) Field of Classification Search
  USPC ....................................................... 303/152
  See application file for complete search history.

(56) References Cited

U.S. PATENT DOCUMENTS 5,788,597 A     8/1998  Boll et al.
(Continued)

FOREIGN PATENT DOCUMENTS

DE       198 43 580 A1     3/2000
DE   10 2008 023 731 A1    1/2009
(Continued)

OTHER PUBLICATIONS

German Search Corresponding to DE 10 2010 029 386.5.
(Continued)

*Primary Examiner* — Dirk Wright
(74) *Attorney, Agent, or Firm* — Davis & Bujold, PLLC; Michael J. Bujold

(57) ABSTRACT

A method for operating a drive-train of a motor vehicle with a drive aggregate in the form of a hybrid drive system (3) which comprises at least one electric machine (2), an internal combustion engine (1), a transmission (5), a drive output (4) and a brake system which comprises at least one wear-free permanent brake (6). When a braking torque is required, the braking torque is distributed between the electric machine (2) and the wear-free permanent brake (6). At the beginning of a braking torque demand, the required brake torque is provided exclusively by the electric machine (2). Thereafter, as a function of characteristics of the wear-free permanent brake, the braking torque demand is transferred, in a controlled manner, from the electric machine to the wear-free permanent brake (6) so that the sum of the braking torques provided at the drive output (4) corresponds to the required braking torque.

8 Claims, 4 Drawing Sheets

(56) References Cited

U.S. PATENT DOCUMENTS

| | | | |
|---|---|---|---|
| 6,283,239 B1 | 9/2001 | Tsukamoto et al. | |
| 7,131,708 B2 * | 11/2006 | Tao et al. | 303/152 |
| 7,828,693 B2 | 11/2010 | Soliman et al. | |
| 8,376,476 B2 * | 2/2013 | Ikeda et al. | 303/152 |
| 2005/0255965 A1 | 11/2005 | Tao et al. | |
| 2008/0174174 A1 * | 7/2008 | Burns et al. | 303/152 |
| 2011/0049973 A1 | 3/2011 | Wuerth et al. | |
| 2012/0058857 A1 * | 3/2012 | Kaltenbach et al. | 477/4 |

FOREIGN PATENT DOCUMENTS

| | | |
|---|---|---|
| DE | 10 2008 041 760 A1 | 12/2009 |
| EP | 2 127 987 A1 | 12/2009 |
| WO | 2010/046733 A1 | 4/2010 |

OTHER PUBLICATIONS

International Search Corresponding to PCT/EP2011/055164.
Written Opinion Corresponding to PCT/EP2011/055164.

* cited by examiner

METHOD FOR OPERATING A DRIVE TRAIN

This application is a National Stage completion of PCT/EP2011/055164 filed Apr. 4, 2011, which claims priority from German patent application serial no. 10 2010 029 386.5 filed May 27, 2010.

FIELD OF THE INVENTION

The invention concerns a method for operating a drive-train of a motor vehicle.

BACKGROUND OF THE INVENTION

The present invention concerns a method for operating a drive-train with a hybrid drive system. Such a hybrid drive system comprises at least one electric machine and an internal combustion engine. In addition to the hybrid drive system a drive-train of a hybrid vehicle comprises a transmission, which converts rotational speeds and torques so as to transmit a traction force provided by the hybrid drive system to a drive output of the hybrid vehicle. Moreover, a drive-train of a hybrid vehicle comprises a brake system and it is already known from the prior art that a brake system can comprise more than one partial brake system, namely a so-termed service brake which acts by friction on wheels of the drive output, and at least one wear-free permanent brake. The wear-free permanent brake can be a so-termed engine brake or a retarder of the drive-train.

From DE 198 43 580 A1 a brake system of a motor vehicle is known, in which a required braking force or braking torque is distributed between the friction brake of the brake system and the permanent brake thereof. According to this prior art, it is proposed that when the permanent brake is actuated the friction brake is acted upon by a pressure, which at first corresponds to a signal from a braking value emitter and, as the braking force of the permanent brake increases, is reduced in such manner that the total braking force corresponds to the signal from the braking value emitter. In this way the friction brake is fully effective in situations requiring a short response time, whereas during a longer braking operation the permanent brake takes over all of the braking action and so protects the friction brake from overload.

US2005/255965 A1 and EP 2 127 987 A1 described methods such that in a hybrid drive system with an internal combustion engine and an electrical drive unit, the braking torque is initially applied by the electrical drive unit and thereafter, as a function of the characteristics of the permanent brake, is distributed between the electrical drive unit or electric brake and other permanent brake in such a manner that the sum corresponds to a braking requirement.

SUMMARY OF THE INVENTION

Starting from there the present invention addresses the problem of providing a new type of method for operating a drive-train.

According to the invention, when a braking torque is required at the drive output of a hybrid vehicle, the braking torque is distributed between the, or each electric machine of the hybrid drive system and the, or each wear-free permanent brake, in such manner that at the beginning of a braking torque demand the braking torque is provided exclusively by an electric machine of the hybrid drive system and is delivered to the drive output, while thereafter, as a function of the characteristics of the, or of each wear-free permanent brake, the braking torque demand is transferred at least in part by the, or by each electric machine to at least one wear-free permanent brake in a controlled manner, such that the sum of the braking torques provided at the drive output by the, or by each electric machine and by the, or by each permanent brake corresponds to the required braking torque.

With the present invention it is proposed for the first time that the braking torque required from a brake system of a hybrid vehicle is distributed between the, or each electric machine of the hybrid drive system and the, or each wear-free permanent brake of the brake system, namely in such manner that at the beginning of a braking demand the braking torque is called for exclusively from at least one electric machine of the hybrid drive and provided at the drive output. Only after this, and depending on the characteristics of the, or of each wear-free permanent brake, is the braking torque demand transferred at least in part from the, or from each electric machine to at least one wear-free permanent brake of the brake system, in a controlled manner. This takes place in such a way that the sum of the braking torques provided at the drive output by the, or by each electric machine and by the, or by each permanent brake corresponds to the braking torque required.

Accordingly, at the beginning of a braking torque demand it is possible with the method according to the invention, by means of at least one electric machine of the hybrid drive system to provide a braking torque at the drive output directly, with high dynamics and in a short time, and thus to react directly to a braking torque demand. Thereafter, in a controlled manner the braking torque demand is reduced at the respective electric machine(s) of the hybrid drive and at the same time increased at one or more wear-free permanent brakes of the brake system in order, in a controlled manner, to build up a braking torque that can be provided at the drive output by the respective wear-free permanent brake(s).

During this the braking torque provided at the drive output by the, or by each electric machine is reduced by the amount by which, in a controlled manner, the braking torque is built up at the drive output by the respective wear-free brake(s).

In this way it is made ultimately possible, at the beginning of a braking torque demand, on the one hand, to provide a desired braking torque at the drive output with high dynamics and within a short reaction time, and, on the other hand, to use the respective wear-free permanent brake(s) in a controlled and regulated manner for building up the braking torque.

Thereafter, as the speed of the drive output continues to be reduced, the braking torque demand is transferred from the, or from each wear-free permanent brake back to at least one electric machine of the hybrid drive system, again in a controlled manner such that the sum of the braking torques provided at the drive output by the, or by each electric machine and by the, or by each wear-free permanent brake corresponds to the desired or required braking torque.

This makes it possible, if as a result of a continuously decreasing drive output rotational speed, the respective wear-free permanent brake(s) can no longer provide a sufficiently large braking torque at the drive output, to withdraw the respective wear-free permanent brake(s) from the braking torque demand in a controlled manner in order that the braking torque which can no longer be provided by the wear-free permanent brake(s) is compensated with the support of at least one electric machine of the hybrid drive system.

BRIEF DESCRIPTION OF THE DRAWINGS

Preferred further developments of the invention emerge from the following description. Example embodiments of the invention, to which it is not limited, are explained in more detail with reference to the drawings, which show.

DETAILED DESCRIPTION OF THE PREFERRED EMBODIMENTS

Figure 1:
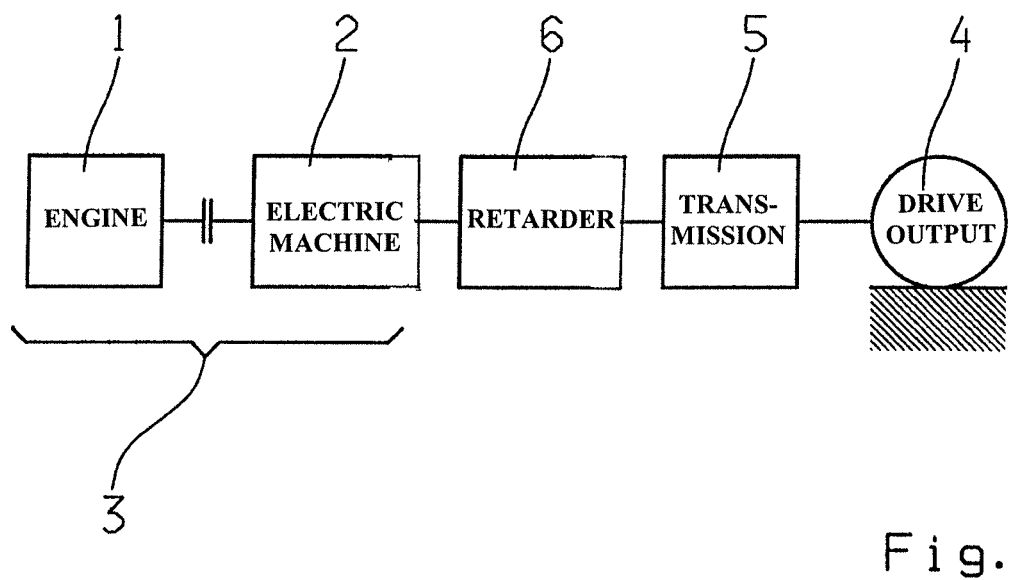
FIG. 1: A block diagram representing an example of a drive-train, to clarify the method according to the invention.

FIG. 1 shows as an example a drive-train layout of the drive-train of a hybrid vehicle, with which the method according to the invention can be used. Thus, the drive-train of FIG. 1 comprises an internal combustion engine 1 and an electric machine 2, which together form a hybrid drive system 3 of the drive-train. FIG. 1 also shows that both a transmission 5 and a retarder 6 are connected between the hybrid drive 3, specifically its electric machine 2, and a drive output 4, the retarder 6 being a wear-free permanent brake.

As shown in FIG. 1, the retarder 6 is connected between the electric machine 2 of the hybrid drive system 3 and the transmission 5. Alternatively, it is also possible for the retarder 6 to be connected between the transmission 5 and the drive output 4 or between the internal combustion engine 1 and the electric machine 2.

Already at this point it should be mentioned that the method according to the invention is not limited in its application to the drive-train shown in FIG. 1. Rather, the invention can be used with other drive-trains of hybrid vehicles, for example when the internal combustion engine and the electric machine of the hybrid drive system act upon different axles of the drive output of the hybrid vehicle.

A drive-train of a hybrid drive system comprises a brake system by means of which a braking torque can be provided at the drive output 4. Thus, a brake system of the hybrid vehicle comprises a service brake, which acts upon the wheels of the drive output 4 by friction.

Besides the service brake, the brake system of a hybrid vehicle comprises at least one wear-free permanent brake, the wear-free permanent brake being for example the retarder 6 shown in FIG. 1. A further wear-free permanent brake of a brake system in a hybrid vehicle is provided by a so-termed engine brake of the internal combustion engine.

In the context of the present invention it is proposed that when a braking torque is required at the drive output, the braking torque called for is distributed at least between the, or each electric machine 2 of the hybrid drive system 3 and the, or each wear-free permanent brake.

This distribution of the braking torque required takes place in such a way that at the beginning of a braking torque demand the braking torque is called for exclusively from at least one electric machine 2 of the hybrid drive system 3 and provided at the drive output 4, and thereafter, depending on characteristics of the, or of each wear-free permanent brake, the braking torque is transferred at least partially and in a controlled manner from the, or each electric machine 2 of the hybrid drive 3 to at least one wear-free permanent brake 6, in such manner that the sum of the braking torques provided at the drive output 4 by the, or by each electric machine 2 of the hybrid drive 3 and by the, or by each permanent brake corresponds to the braking torque required.

Below, details of this process are described with reference to FIG. 2, which shows a number of curve shapes plotted as a function of time t, namely a time variation of a rotational speed $n_{AB}$ of the drive output 4 of the drive-train, a time variation $M_B$ of a braking torque called for by a braking torque demand, a time variation $M_R$ of a braking torque provided at the drive output 4 by the retarder 6 and a time variation $M_{EM}$ of a braking torque provided at the drive output 4 by the electric machine 2.

Figure 2:
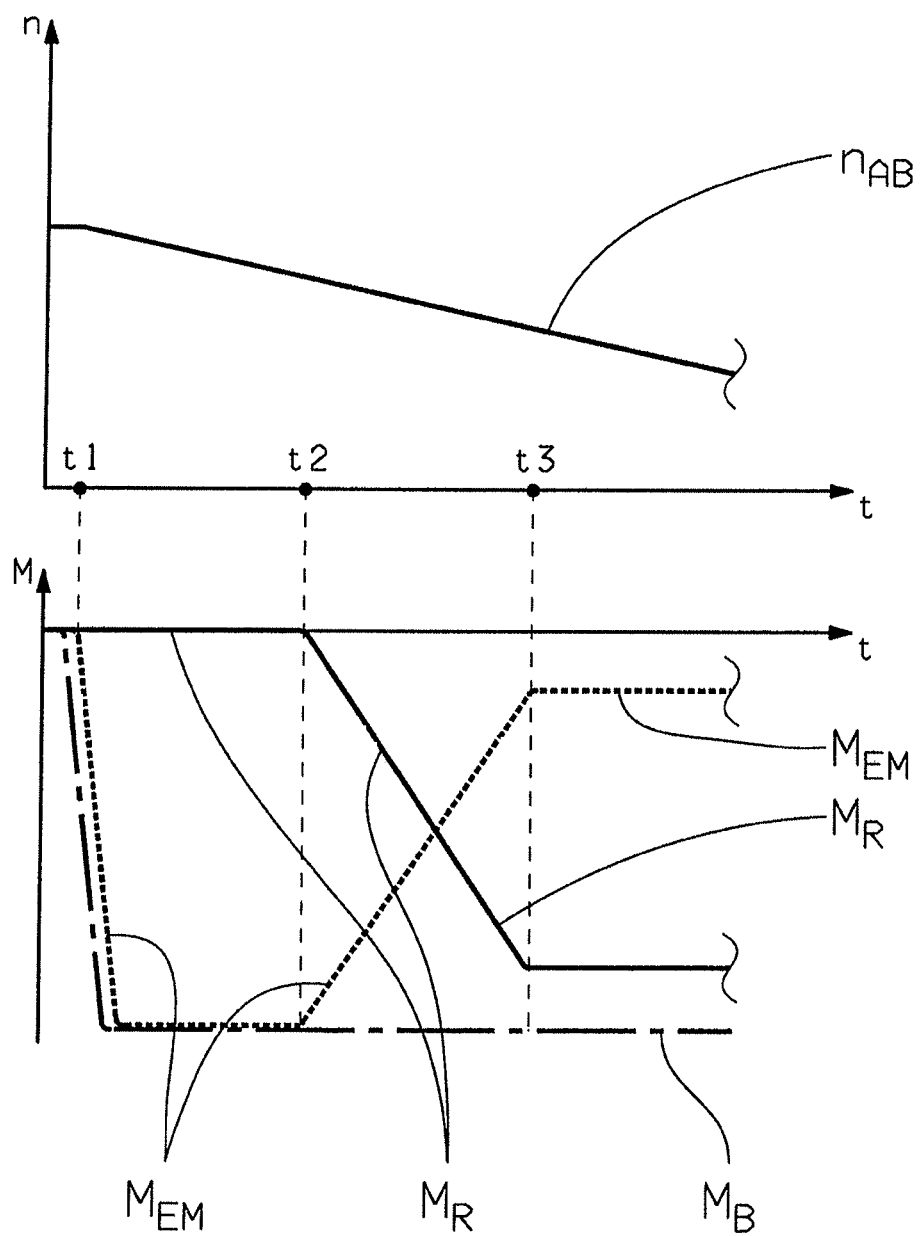
FIG. 2: A first diagram for the further clarification of the method according to the invention.

Beginning at time t1, in FIG. 2 a braking torque demand $M_B$ for a braking torque to be provided at the drive output 4 is issued. According to the invention, at the beginning of this braking torque demand, i.e. immediately after time t1, this braking torque demand is directed exclusively to the electric machine 2 so that at the beginning of the braking torque demand, i.e. immediately after time t1, the braking torque $M_B$ called for is provided at the drive output 4 in the form of the braking torque $M_{EM}$ that can be provided by the electric machine 2.

Only after this, namely in FIG. 2 beginning at time t2, as a function of characteristics of the retarder 6 the braking torque demand $M_B$ is transferred progressively and in a controlled manner at least in part from the electric machine 2 to the retarder 6, in such manner that the sum of the braking torque $M_{EM}$ provided at the drive output 4 by the electric machine 2 and the braking torque $M_R$ provided at the drive output 4 by the retarder 6 corresponds to the braking torque $M_B$ required.

In FIG. 2, the braking torque $M_B$ demanded remains constant so that in total the electric machine 2 and the retarder 6 provide an approximately constant braking torque at the drive output 4.

In FIG. 2 the partial transfer of the braking torque demand from the electric machine 2 of the hybrid drive system 3 to the retarder 6 or wear-free permanent brake takes place between times t2 and t3, in each case in a ramp-like or linear manner, i.e. between times t2 and t3, on the one hand, the braking torque demanded from the electric machine 2 of the hybrid drive 3 is reduced in a ramp-like manner and, on the other hand, the braking torque demanded from the wear-free permanent brake, namely from the retarder 6, is increased in a ramp-like manner, and so too therefore are the braking torques $M_{EM}$ and $M_R$ respectively provided by them at the drive output 4.

As already explained, this transfer of the braking torque demand takes place as a function of characteristics of the retarder 6, such that the transfer is determined prior to the actual braking torque demand and thus offline as a function of the characteristics of the retarder 6, so that the transfer of the braking torque demand takes place between times t2 and t3 in the manner of a pilot-controlled transfer of the braking torque demand or in the manner of a pilot control.

Figure 3:
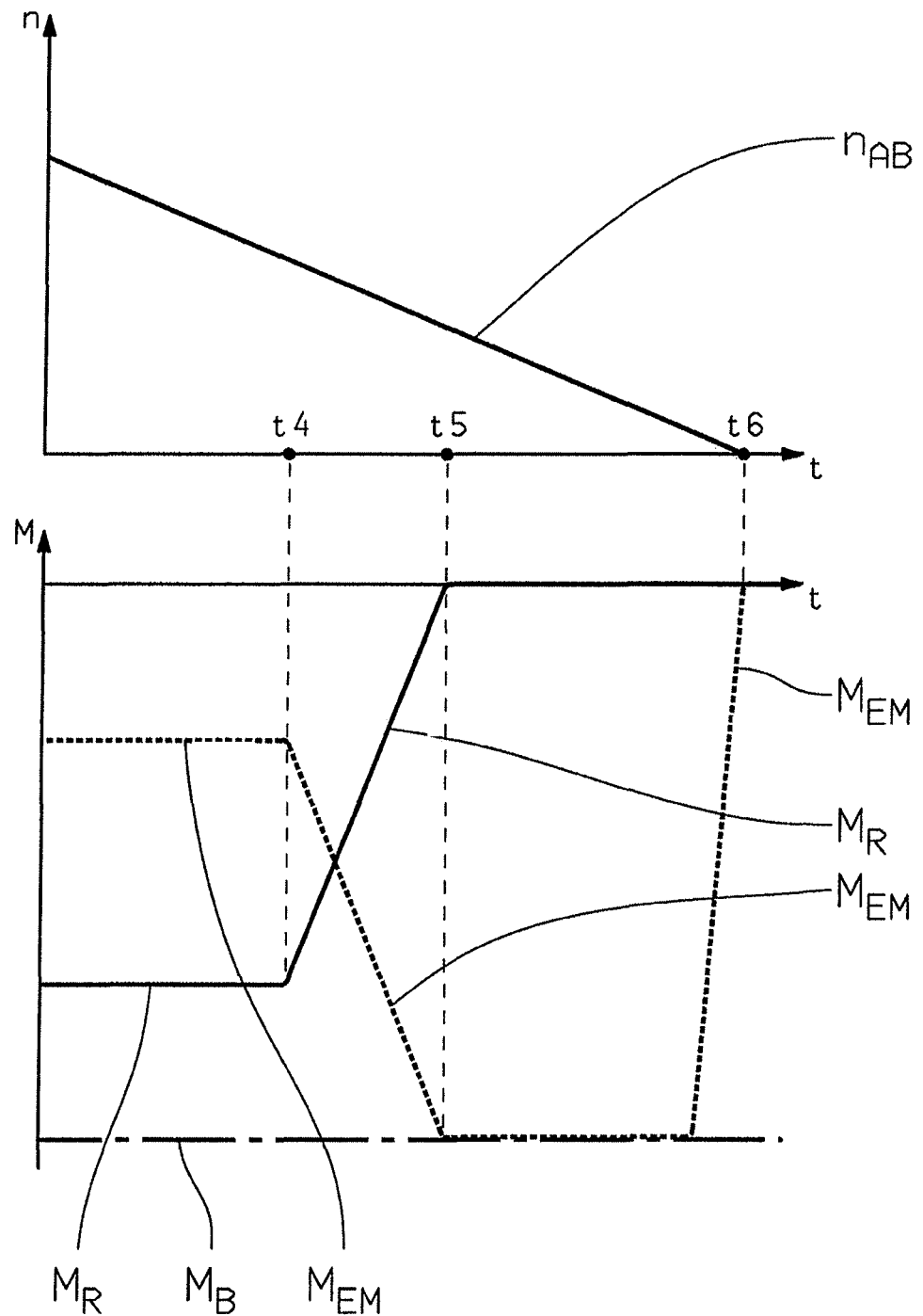
FIG. 3: A second diagram for the further clarification of the method according to the invention.

FIG. 3 shows a further development of the method according to the invention, for the case when the drive output speed $n_{AB}$ decreases progressively. Thus, it can be seen from FIG. 3 that when the drive output rotational speed $n_{AB}$ at the drive output 4 and hence also the driving speed of the hybrid vehicle decrease progressively, there again takes place a transfer of the braking torque demand from the retarder 6 to the electric machine 2 of the hybrid drive 3, namely as shown in FIG. 3 between times t4 and t5.

This further development of the method according to the invention is based on the recognition that when the rotational speed falls below a minimum value, the retarder 6 can no longer provide any braking torque at the drive output 4. From a timely moment before the speed has fallen below the minimum, according to the invention the braking torque demand at the retarder 6 is reduced continuously, preferably in a ramp-like and therefore controlled manner, and is correspondingly increased continuously, preferably in a ramp-like manner at the electric machine 2 of the hybrid drive system 3, in such a way that the sum of the braking torques provided at the drive output 4 by the retarder 6 and by the electric machine 2 again corresponds to the required braking torque $M_B$.

The time-point t4 from which, as the drive output speed $n_{AB}$ decreases progressively, the braking torque demanded from the retarder 6 is transferred back to the electric machine 2, can be determined offline in advance as a function of characteristics of the retarder 6. Preferably, however, the procedure adopted is that during the braking torque demand and hence while braking is taking place the current drive output speed $n_{AB}$ at the drive output 4 is monitored and, as a function thereof, in the sense of a control-technological observation the time t4 from which the torque transfer from the retarder 6 to the electric machine 2 begins is determined online while the braking torque demand is being implemented.

From time t5, after which the retarder 6 can no longer provide any braking torque $M_R$ at the drive output 4, it is exclusively the electric machine 2 which provides a corresponding braking torque $M_{EM}$ at the drive output 4.

Then, when at time t6 the hybrid vehicle has come to rest, for the protection of the electric machine 2 of the hybrid drive system 3, the braking torque $M_{EM}$ that it provides is reduced to zero and thereafter the required braking torque is provided by a service brake of the brake system, which in particular acts upon the wheels of the drive output 4 by friction.

Figure 4:
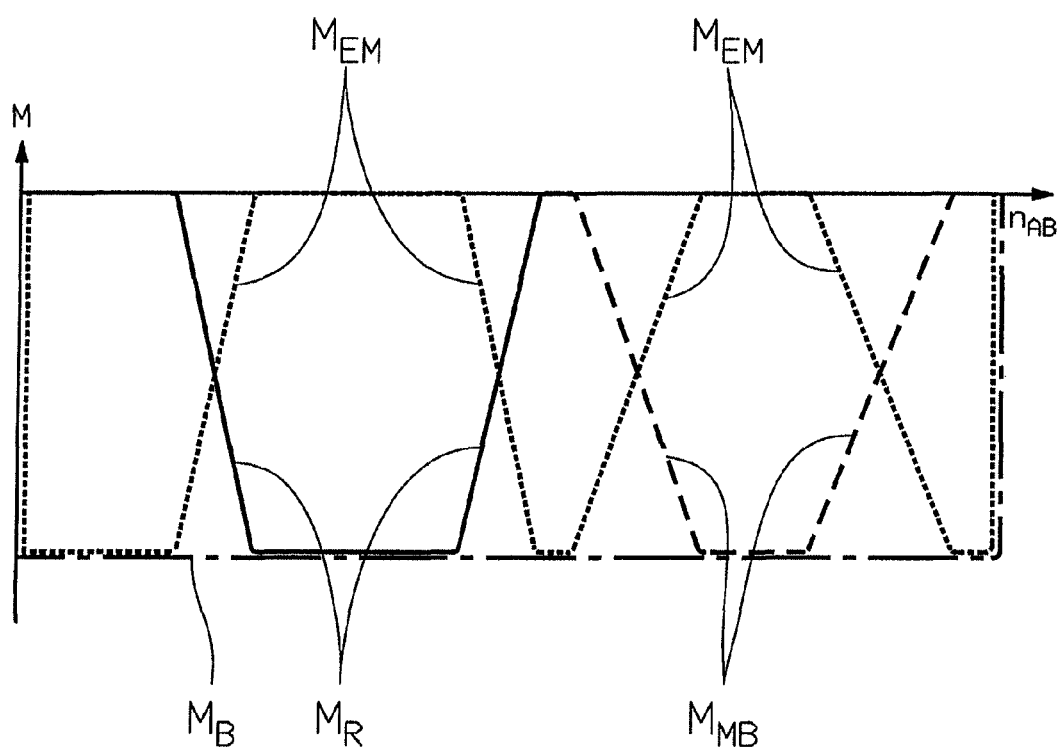
FIG. 4: A third diagram for the further clarification of the method according to the invention.

FIG. 4 shows a variant of the invention in which a braking torque demand is distributed between the electric machine 2 of a hybrid drive system and two wear-free part-brakes of the brake system of the hybrid vehicle, namely between an engine brake and a retarder.

Thus FIG. 4 shows torque variations as a function of the rotational speed $n_{AB}$ of the drive output 4 of a hybrid vehicle, namely the speed-dependent variation of a required braking torque $M_B$, the speed-dependent variation of a braking torque $M_{EM}$ provided by the electric machine 2 of the hybrid drive system at the drive output 4, the speed-dependent variation of a braking torque $M_{MB}$ provided by an engine brake at the drive output 4 and the speed-dependent variation of a braking torque $M_R$ provided by the retarder at the drive output 4. From FIG. 4 it can be seen that, on the one hand, between the electric machine 2 and the engine brake, and, on the other hand, between the electric machine 2 and the retarder 6, according to the invention a controlled transfer of the braking torque demand takes place, such that the sum of the braking torques provided by the respective component braking systems at the drive output 4 corresponds to the braking torque $M_B$ required.

Thus, in the context of the present invention, in a drive-train of a hybrid vehicle a braking torque called for from a brake system is distributed between an electric machine 2 of the hybrid drive system 3 and at least one wear-free permanent brake of the hybrid vehicle, namely a retarder and/or an engine brake.

By virtue of the dynamic behavior of the electric machine 2 of the hybrid drive system 3, which is operated as a generator when providing a braking torque, the sluggish dynamic response of the retarder or the engine brake can be compensated. Thus, at the beginning of a braking torque demand, at first the required braking torque is provided at the drive output 4 by means of at least one electric machine 2 of the hybrid drive system 3. Thereafter, by means of the wear-free permanent brake, in particular by a retarder or if necessary an engine brake, braking torque is built up at the drive output in a controlled manner. Then, when as a function of the drive output speed of the drive output the retarder or engine brake can no longer provide any braking torque, in a controlled manner the retarder or engine brake is withdrawn from braking action at the drive output 4 and then the, or each electric machine 2 of the hybrid drive system 3, now operating in generator mode, takes over the reduced braking torque demanded from the wear-free permanent brake concerned and provides the corresponding braking torque at the drive output.

With the help of the present invention, during an overall braking torque demand, both at the beginning of the braking torque demand and also at the end of the braking torque demand when the drive output speed is decreasing progressively, the desired braking torque can be provided at the drive output reliably and with no risk of over-braking and no risk of oscillations in the drive-train.

Indexes

1 Internal combustion engine
2 Electric machine
3 Hybrid drive system
4 Drive output
5 Transmission
6 Retarder The invention claimed:
1. A method of operating a drive-train of a motor vehicle comprising a hybrid drive system (3) comprising an internal combustion engine (1), at least one electric machine (2), a transmission (5), a drive output (4) and a brake system comprising at least one wear-free permanent brake so that, when a braking torque is required at the drive output (4), the braking torque being distributed between the at least one electric machine (2), of the hybrid drive system (3), and the at least one wear-free permanent brake in such manner that, at the beginning of a braking torque demand, the braking torque is called for and provided at the drive output (4) exclusively by the at least one electric machine of the hybrid drive system (3) and, thereafter, as a function of characteristics of the at least one wear-free permanent brake, the braking torque demand being transferred at least in part, in a controlled manner, from the at least one electric machine (2) to the at least one wear-free permanent brake, such that a sum of the braking torques, provided at the drive output by the at least one electric machine (2) and the at least one permanent brake, corresponds to a required braking torque, the method comprising the steps of:
  transferring the braking torque demanded from the at least one electric machine (2) of the hybrid drive system (3), in a controlled manner, to the at least one wear-free permanent brake such that the braking torque demanded, from the at least one electric machine (2) of the hybrid drive (3), is continuously reduced;
  continuously increasing the braking torque demanded, from the at least one wear-free permanent brake, in a ramp-like manner so that this continuous and ramp-like transfer of the braking torque demand is determined in advance as a function of characteristics of the at least one wear-free permanent brake and, therefore, occurs in the manner of a pilot-controlled transfer of the braking torque demanded.

2. The method according to claim 1, further comprising the step of transferring the braking torque demand, as drive output rotational speed decreases progressively, in a controlled manner, from the at least one wear-free permanent brake to the at least one electric machine (2) of the hybrid drive system (3) such that a sum of the braking torques provided at the drive output (4), by the at least one electric machine (2) of the hybrid drive (3) and by the at least one permanent brake, corresponds to the required braking torque.

3. The method according to claim 2, further comprising the step of transferring the braking torque demanded from the at least one wear-free permanent brake to the at least one electric machine (2) of the hybrid drive system (3), in a controlled manner, such that the braking torque demanded from the at least one wear-free permanent brake is continuously reduced, in a ramped manner, while the braking torque demanded from the at least one electric machine (2) of the hybrid drive (3) is increased continuously, in a ramped manner, and the continuous and ramped transfer is determined, while the braking torque demand is in force, as a function of a current drive output speed.

4. The method according to claim 1, further comprising the steps of calling for the braking torque exclusively from a service brake of the brake system, and providing the braking torque at the drive output (4) of the drive-train, when the drive output speed is reduced, until the motor vehicle is at rest.

5. The method according to claim 1, further comprising the steps of using a retarder (6) as the at least one wear-free permanent brake, calling for the braking torque from the at least one electric machine (2) of the hybrid drive system (3) and from the at least one wear-free permanent brake, and providing the braking torque at the drive output (4).

6. The method according to claim 1, further comprising the steps of using an engine brake as the at least one wear-free permanent brake, calling for the braking torque from the at least one electric machine (2) of the hybrid drive system (3) and from the at least one wear-free permanent brake, and providing the braking torque at the drive output (4).

7. The method according to claim 1, further comprising the steps of calling for the braking torque from the at least one electric machine (2) of the hybrid drive system (3), from a first wear-free permanent brake and from a second wear-free permanent brake, using an engine brake as the first wear-free permanent brake and a retarder (6) as the second wear-free permanent brake, and providing the braking torque at the drive output (4).

8. A method of operating a drive-train of a motor vehicle comprising a hybrid drive system (3) comprising an internal combustion engine (1), at least one electric machine (2), a transmission (5), a drive output (4) and a brake system comprising at least one wear-free permanent brake for providing braking torque when required braking torque is required at the drive output (4), the method comprising the steps of:

initially applying a total amount of the required braking torque to the drive output exclusively via the at least one electric machine of the hybrid drive system;

subsequently, initiating application of an amount of the required braking torque to the drive output via at least one permanent brake;

determining a rate of decreasing the amount of the required braking torque applied by the at least one electric machine and a rate of increasing an amount of the required braking torque applied by the at least one permanent brake, and the rates of increasing and decreasing being a function of characteristics of the at least one permanent brake; and simultaneously increasing the amount of the required braking torque applied to the drive output, by the permanent brake, and reducing the amount of the required braking torque applied to the drive output, by the electric machine, according to determined rates such that the total amount of the required braking torque applied to the drive output remains constant.

* * * * *